US010612406B2

(12) United States Patent
Smiddy et al.

(10) Patent No.: US 10,612,406 B2
(45) Date of Patent: Apr. 7, 2020

(54) SEAL ASSEMBLY WITH SHIELD FOR GAS TURBINE ENGINES

(71) Applicant: United Technologies Corporation, Farmington, CT (US)

(72) Inventors: Winston Gregory Smiddy, Saco, ME (US); Paul M. Lutjen, Kennebunkport, ME (US); Dominic J. Mongillo, Jr., West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 167 days.

(21) Appl. No.: 15/957,053

(22) Filed: Apr. 19, 2018

(65) Prior Publication Data

US 2019/0323373 A1  Oct. 24, 2019

(51) Int. Cl.
*F01D 11/08* (2006.01)
*F01D 11/00* (2006.01)
(Continued)

(52) U.S. Cl.
CPC .............. *F01D 11/08* (2013.01); *F01D 9/023* (2013.01); *F01D 9/065* (2013.01); *F01D 11/006* (2013.01);
(Continued)

(58) Field of Classification Search
CPC ........ F01D 5/3007; F01D 9/023; F01D 9/065; F01D 11/005; F01D 11/006; F01D 11/08;
(Continued)

(56) References Cited

U.S. PATENT DOCUMENTS 3,728,039 A * 4/1973 Plemmons ............... B60Q 1/38
                                                                  415/115
4,712,979 A   12/1987 Finger
(Continued)

FOREIGN PATENT DOCUMENTS

EP   2441920   4/2012
EP   2469034   6/2012
(Continued)

OTHER PUBLICATIONS

International Search Report and Written Opinion for International Application No. PCT/US2014/050864 dated Nov. 20, 2014.
(Continued)

*Primary Examiner* — Igor Kershteyn
(74) *Attorney, Agent, or Firm* — Carlson, Gaskey & Olds, P.C.

(57) ABSTRACT

A seal assembly for a gas turbine engine according to an example of the present disclosure includes, among other things, a seal having an elongated seal body extending between a seal face that faces toward a gas path and a backside face opposite the seal face, and the seal face extending circumferentially between first and second mate faces. The seal body defines an internal cavity that extends circumferentially from a first opening along the first mate face to a second opening along the second mate face, and the backside face extends between the first and second openings. A shield includes a shield body that spans between the first and second openings such that the backside face is situated between the internal cavity and the shield body.

23 Claims, 8 Drawing Sheets

(51) Int. Cl.
*F01D 9/02* (2006.01)
*F01D 9/06* (2006.01)
*F01D 5/30* (2006.01)

(52) U.S. Cl.
CPC ........ *F01D 5/3007* (2013.01); *F05D 2240/11* (2013.01); *F05D 2240/15* (2013.01); *F05D 2240/55* (2013.01); *F05D 2240/81* (2013.01); *F05D 2240/90* (2013.01); *F05D 2260/201* (2013.01); *F05D 2300/6033* (2013.01)

(58) Field of Classification Search
CPC ........ F01D 11/24; F01D 25/12; F01D 25/246; F05D 2240/11; F05D 2240/55; F05D 2240/15; F05D 2240/81; F05D 2240/90; F05D 2250/182; F05D 2250/294; F05D 2260/201; F05D 2300/6033
See application file for complete search history.

(56) References Cited

U.S. PATENT DOCUMENTS

| | | | |
|---|---|---|---|
| 5,273,396 A * | 12/1993 | Albrecht | F01D 11/24 415/115 |
| 5,413,458 A | 5/1995 | Calderbank | |
| 5,964,575 A | 10/1999 | Marey | |
| 6,146,091 A * | 11/2000 | Watanabe | F01D 9/04 415/111 |
| 6,508,620 B2 | 1/2003 | Sreekanth et al. | |
| 6,997,673 B2 | 2/2006 | Morris et al. | |
| 7,604,456 B2 | 10/2009 | Schiavo, Jr. et al. | |
| 7,625,172 B2 | 12/2009 | Walz et al. | |
| 7,665,962 B1 * | 2/2010 | Liang | F01D 11/24 415/173.1 |
| 8,016,546 B2 | 9/2011 | Surace et al. | |
| 8,251,652 B2 | 8/2012 | Campbell et al. | |
| 8,303,247 B2 * | 11/2012 | Schlichting | F01D 11/122 29/424 |
| 8,388,300 B1 | 3/2013 | Liang | |
| 8,727,704 B2 * | 5/2014 | Lee | F01D 11/08 415/116 |
| 9,017,012 B2 * | 4/2015 | Brunelli | F01D 25/12 415/115 |
| 9,080,458 B2 * | 7/2015 | Romanov | F01D 11/08 |
| 2004/0076520 A1 | 4/2004 | Dellmann et al. | |
| 2008/0190114 A1 | 8/2008 | Surace et al. | |
| 2009/0028692 A1 | 1/2009 | Surace et al. | |
| 2016/0097303 A1 * | 4/2016 | Baldiga | F01D 11/08 416/182 |
| 2016/0376921 A1 * | 12/2016 | O'Leary | F01D 25/12 415/116 |
| 2017/0204737 A1 | 7/2017 | Varney et al. | |
| 2018/0023408 A1 | 1/2018 | Rice et al. | |

FOREIGN PATENT DOCUMENTS

| | | |
|---|---|---|
| EP | 2562365 | 2/2013 |
| EP | 3219924 | 9/2017 |
| WO | 2015138027 | 9/2015 |

OTHER PUBLICATIONS

Supplementary European Search Report for European Patent Application No. 14837927.4 completed Mar. 23, 2017.
International Preliminary Report on Patentability for PCT Application No. PCT/US2014/050864 dated Feb. 23, 2016.
European Search Report for European Patent Application No. 19170094.7 completed Jul. 22, 2019.

* cited by examiner

SEAL ASSEMBLY WITH SHIELD FOR GAS TURBINE ENGINES

BACKGROUND

This disclosure relates to sealing for adjacent components of a gas turbine engine, including shielding for seals of a seal assembly.

A gas turbine engine typically includes at least a compressor section, a combustor section and a turbine section. The compressor section pressurizes air into the combustion section where the air is mixed with fuel and ignited to generate an exhaust gas flow. The exhaust gas flow expands through the turbine section to drive the compressor section and, if the engine is designed for propulsion, a fan section.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged in an array. The arc segments are exposed to relatively hot gases in the gas flow path and may be configured to receive cooling airflow to cool portions of the shrouds. Impingement cooling may be utilized to cool surfaces of the shrouds.

SUMMARY

A seal assembly for a gas turbine engine according to an example of the present disclosure includes a seal having an elongated seal body extending between a seal face that faces toward a gas path and a backside face opposite the seal face, and the seal face extending circumferentially between first and second mate faces. The seal body defines an internal cavity that extends circumferentially from a first opening along the first mate face to a second opening along the second mate face, and the backside face extends between the first and second openings. A shield includes a shield body that spans between the first and second openings such that the backside face is situated between the internal cavity and the shield body.

In a further embodiment of any of the foregoing embodiments, the seal is made of a first material including a ceramic material, and the seal has a unitary construction.

In a further embodiment of any of the foregoing embodiments, the shield body is dimensioned to substantially follow a contour of the backside face.

In a further embodiment of any of the foregoing embodiments, the shield body is spaced apart from the backside face to define at least one backside cooling cavity that includes a pair of opposed openings established between the shield body and the seal body.

In a further embodiment of any of the foregoing embodiments, the shield body defines a plurality of grooves and a plurality of ridges that are distributed between opposed end portions of the shield.

In a further embodiment of any of the foregoing embodiments, the plurality of ridges are spaced apart from the backside face and the plurality of grooves contact surfaces of the backside face to define a plurality of backside cooling cavities each with a respective inlet and outlet.

In a further embodiment of any of the foregoing embodiments, the shield body extends circumferentially between opposed end portions, and each of the opposed end portions is mechanical attached to an engagement portion of the seal body adjacent to respective ones of the first and second mate faces.

A further embodiment of any of the foregoing embodiments includes a mounting block including an interface portion extending from a mounting portion, the interface portion abutting an end portion of the shield body to trap the shield body between an engagement portion of the seal body and the interface portion to limit relative movement, and the mounting portion defining an aperture that receives a fastener to mechanically attach the mounting portion to an engine static structure.

In a further embodiment of any of the foregoing embodiments, the interface portion has a dovetail geometry that extends through the first opening to mate with the end portion of the shield body and bound movement of the seal relative to the mounting block.

In a further embodiment of any of the foregoing embodiments, the mounting block is a first mounting block and a second mounting block, and the interface portion of the first mounting block is received in the first opening and the interface portion of the second mounting block is received in the second opening to secure the seal to the engine static structure.

In a further embodiment of any of the foregoing embodiments, the seal is made of a first material, and the mounting block is made of a second material that is the same as the first material.

In a further embodiment of any of the foregoing embodiments, the seal is made of a first material, and the mounting block is made of a second, different material.

In a further embodiment of any of the foregoing embodiments, the first material includes a ceramic material, and the seal has a unitary construction.

In a further embodiment of any of the foregoing embodiments, the seal is made of a first material, and the shield is made of a second, different material.

In a further embodiment of any of the foregoing embodiments, the seal is a blade outer air seal (BOAS).

A gas turbine engine according to an example of the present disclosure includes an engine case extending along an engine axis, an array of blades rotatable about the engine axis, and an array of blade outer air seals distributed about the array of blades to bound a core flow path. Each of the seals includes an elongated seal body including a seal face that faces toward the core flow path and a backside face opposite the seal face. The seal body defines an internal cavity that extends circumferentially between opposed mate faces. An array of shields are distributed about the array of seals, each of the shields including a shield body that spans between the mate faces of a respective one of the seals such that the backside face is situated between the shield body and the respective internal cavity. The engine case defines a plurality of cooling passages that communicate with a cooling source, and each of the plurality of cooling passages defines a passage axis that is oriented such that a projection of the passage axis intersects the shield body of a respective one of the seals.

In a further embodiment of any of the foregoing embodiments, the seal is made of a first material including a ceramic material, and the seal has a unitary construction.

In a further embodiment of any of the foregoing embodiments, the shield body is spaced apart from the backside face of the respective one of the seal bodies to define a plenum and at least one backside cooling cavity, the plenum extends between the shield body and surfaces of the engine case that define the plurality of cooling passages, and the at least one backside cooling cavity includes an inlet and outlet established between the shield body and the respective seal body that communicates with the plenum such that cooling flow from the plurality of cooling passages circulates across the backside face.

A further embodiment of any of the foregoing embodiments includes an array of circumferentially spaced apart mounting blocks. The mate faces of adjacent seals of the array of seals are arranged to define a plurality of intersegment gaps. Each of the mounting blocks is arranged along a respective one of the plurality of intersegment gaps and engages an end portion of a respective shield body to trap the shield body between the respective one of the mounting blocks and the respective one of the adjacent seals, and each of the mounting blocks is mechanically attached to the engine case to limit movement of the adjacent seals relative to the engine case.

A method of sealing of a gas turbine engine according to an example of the present disclosure includes securing a mounting block to an engine static structure such that the mounting block is positioned between mate faces of adjacent blade outer air seals. Each of the adjacent seals includes an elongated seal body including a seal face that bounds a gas path and a backside face opposite the seal face. The seal body defines an internal cavity that extends circumferentially between opposed mate faces. The method includes securing a shield to the engine static structure, the shield including a shield body that spans between the mate faces such that the backside face is situated between the internal cavity and the shield body, and ejecting cooling flow from a plurality of cooling passages towards the shield body.

In a further embodiment of any of the foregoing embodiments, the engine static structure is an engine case that defines the plurality of cooling passages, and each of the plurality of cooling passages defines a passage axis that is oriented such that a projection of the passage axis intersects the shield body.

A further embodiment of any of the foregoing embodiments includes communicating the cooling flow through a plurality of backside cooling cavities established between the backside face and the shield body such that each of the plurality of backside cooling cavities communicates the cooling flow across a respective localized surface of the backside face.

In a further embodiment of any of the foregoing embodiments, the internal cavity is fluidly isolated from the plurality of backside cooling cavities.

The various features and advantages of this invention will become apparent to those skilled in the art from the following detailed description of an embodiment. The drawings that accompany the detailed description can be briefly described as follows.

DETAILED DESCRIPTION

Figure 1:
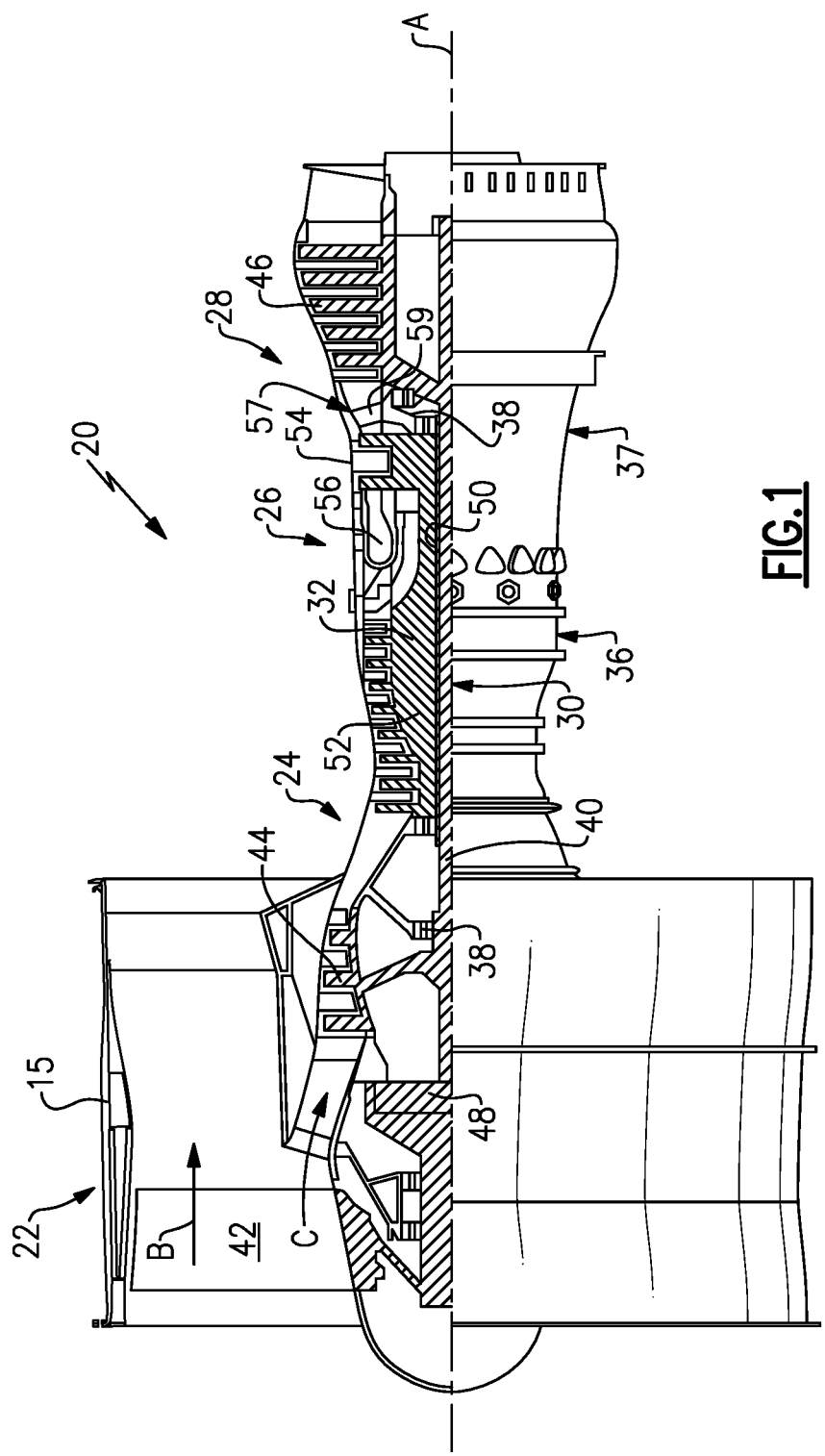
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{-0.5}$. The "Low corrected fan tip speed" as disclosed herein according to one non-limiting embodiment is less than about 1150 ft/second.

Figure 2:
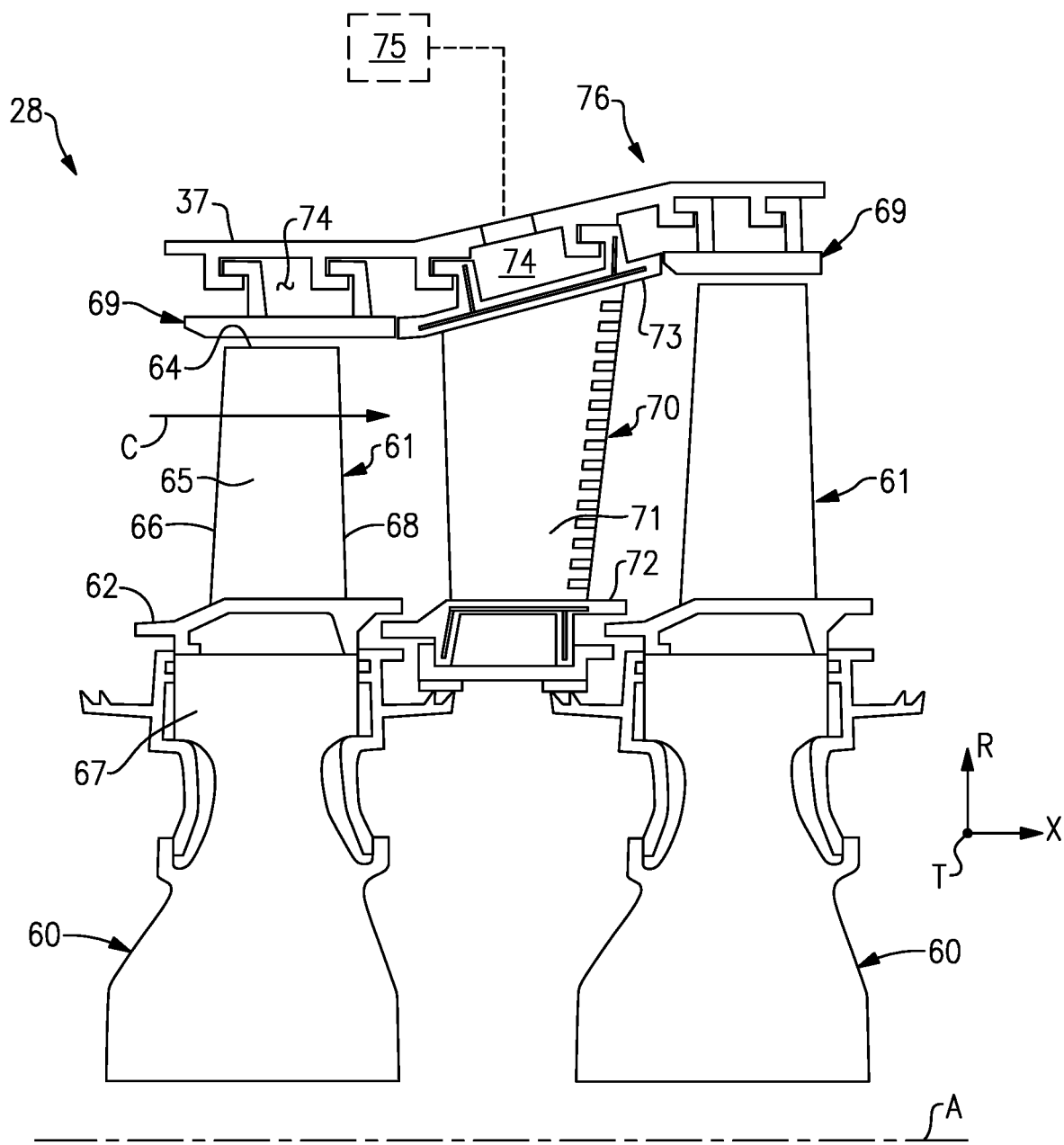
FIG. 2 shows an airfoil arrangement for a turbine section.

FIG. 2 shows selected portions of the turbine section 28 including a rotor 60 carrying one or more blades or airfoils 61 that are rotatable about the engine axis A. In this disclosure, like reference numerals designate like elements where appropriate and reference numerals with the addition of one-hundred or multiples thereof designate modified elements that are understood to incorporate the same features and benefits of the corresponding original elements. Each airfoil 61 includes a platform 62 and an airfoil section 65 extending in a radial direction R from the platform 62 to a tip 64. The airfoil section 65 generally extends in a chordwise or axial direction X between a leading edge 66 and a trailing edge 68. A root section 67 of the airfoil 61 is mounted to, or integrally formed with, the rotor 60. A blade outer air seal (BOAS) 69 is spaced radially outward from the tip 64 of the airfoil section 65. The BOAS 69 can include a plurality of seal arc segments (one shown in FIG. 3 at 169) that are circumferentially arranged in an annulus around the engine axis A. An array of the BOAS 69 are distributed about an array of the airfoils 61 to bound the core flow path C.

A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes an array of airfoils 61, vanes 70, and BOAS 69 arranged circumferentially about the engine axis A.

One or more cooling sources 75 (one shown) are configured to provide cooling air to one or more cooling cavities or plenums 74 defined by an engine static structure such as the engine case 37 or another portion of the engine static structure 36 (FIG. 1). The engine case 37 extends along the engine axis A. In the illustrated example of FIG. 2, the plenums 74 are defined between an engine case 37 and the outer platform 73 and/or BOAS 69. The engine case 37 provides a portion of the engine static structure 36 (FIG. 1) and extends along the engine axis A. The plenums 74 are configured to receive pressurized cooling flow from the cooling source(s) 75 to cool portions of the airfoil 61, BOAS 69 and/or vane 70. Cooling sources 75 can include bleed air from an upstream stage of the compressor section 24 (FIG. 1), bypass air, or a secondary cooling system aboard the aircraft, for example. Each of the plenums 74 can extend in a circumferential or thickness direction T between adjacent airfoils 61, BOAS 69 and/or vanes 70. The tips 64 of each of the airfoil sections 65 and adjacent BOAS 69 are in close radial proximity to reduce the amount of gas flow that escapes around the tips 64 through a corresponding clearance gap.

Figure 3:
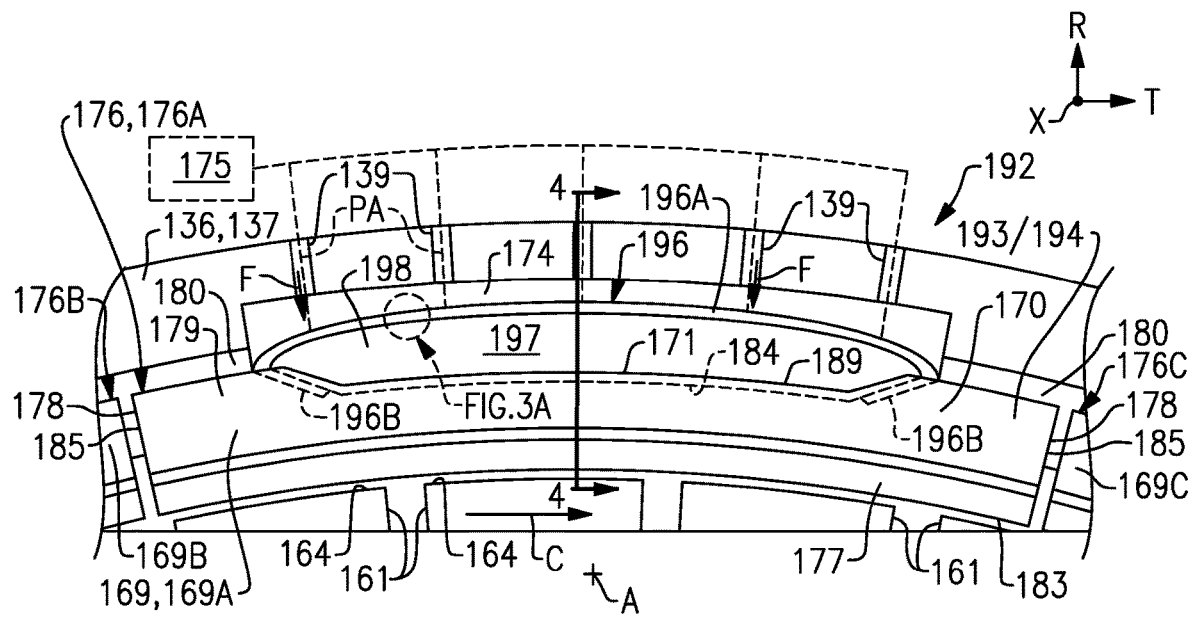
FIG. 3 illustrates an axial view of adjacent seal assemblies.
Figure 4:
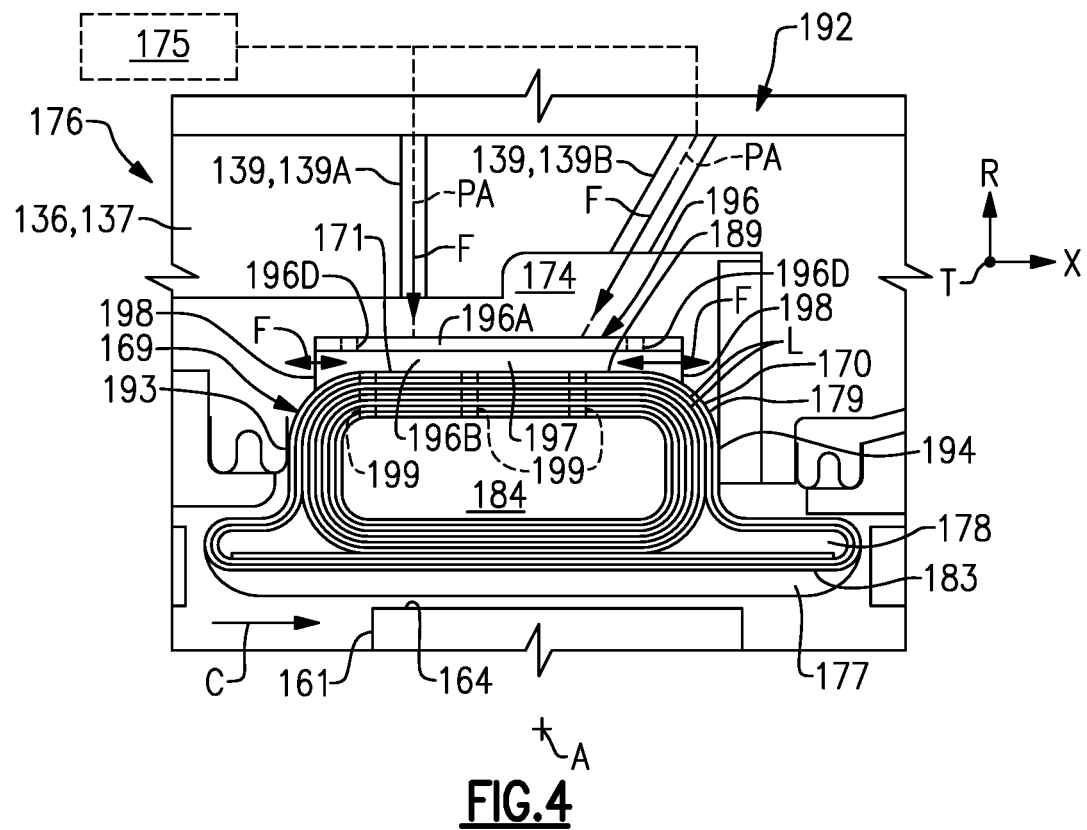
FIG. 4 illustrates a sectional view of one of the seal assemblies including a seal and shield along line 4-4 of FIG. 3.
Figure 5:
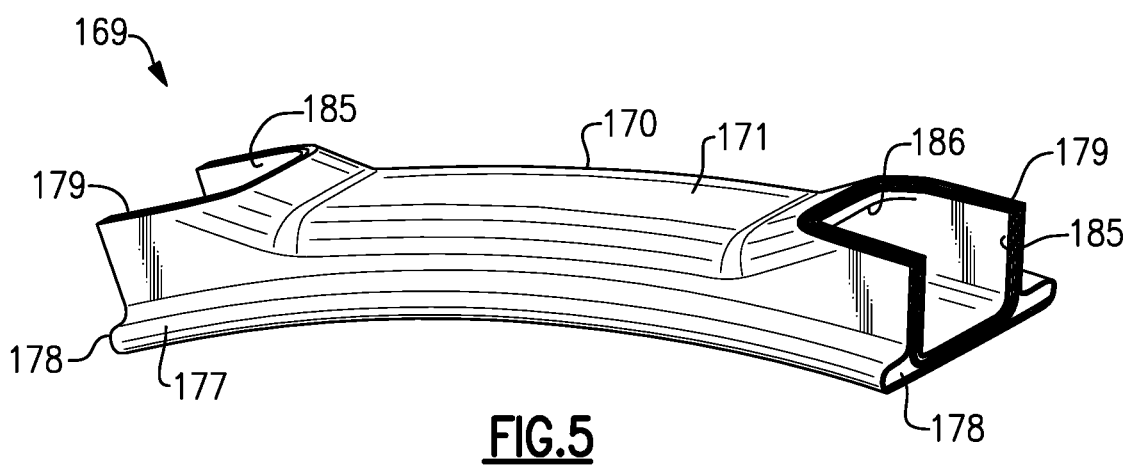
FIG. 5 illustrates an isolated perspective view of the seal of FIG. 4.
Figure 6:
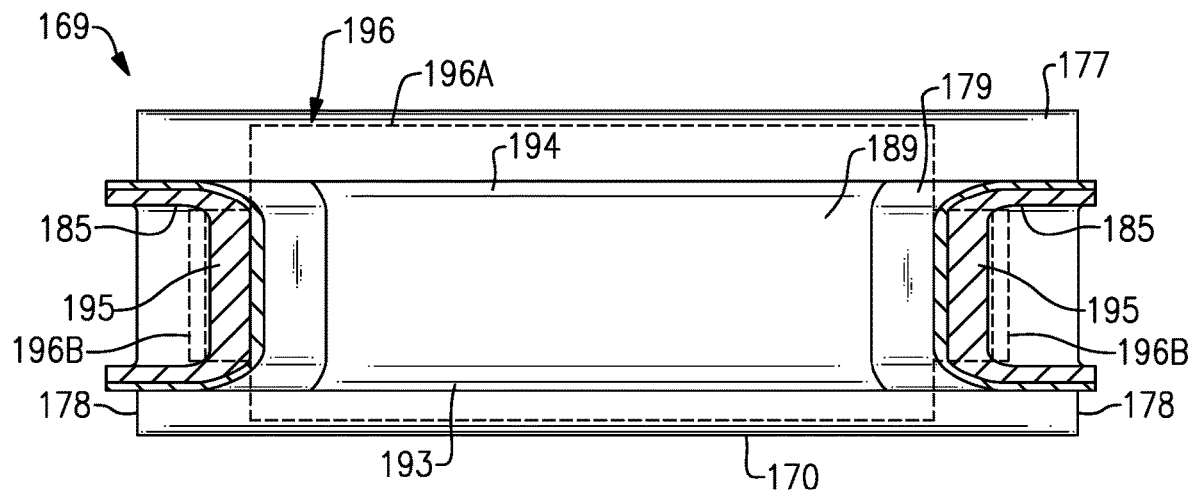
FIG. 6 illustrates a plan view of the seal of FIG. 4, with the shield shown in phantom.
Figure 7:
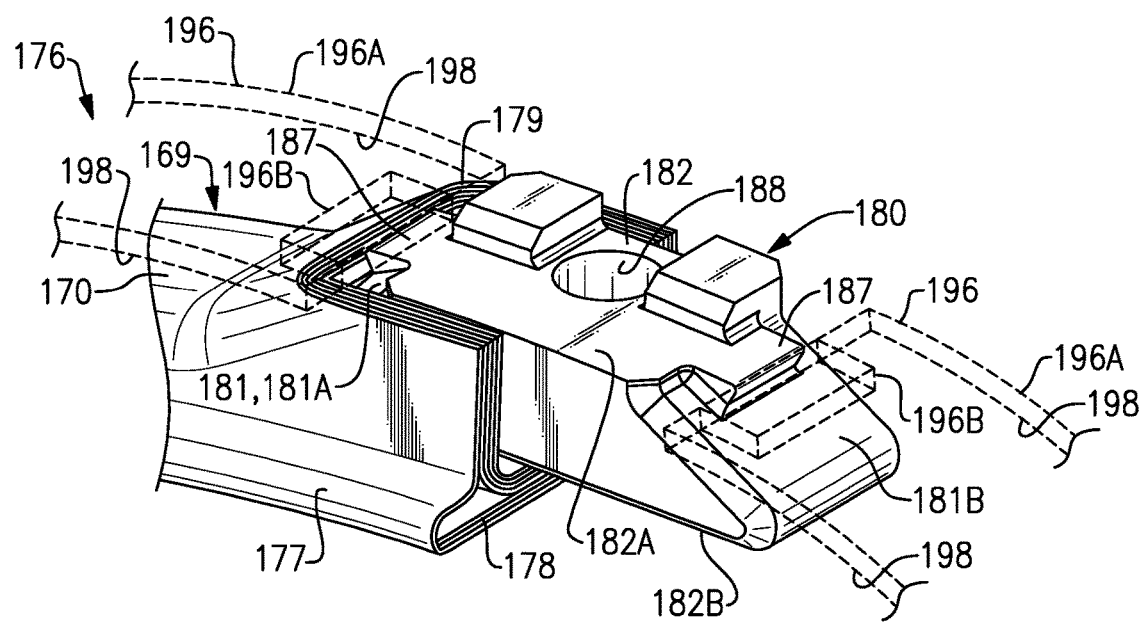
FIG. 7 illustrates a perspective view of a support inserted into the seal of FIG. 4, with adjacent shields shown in phantom.
Figure 8:
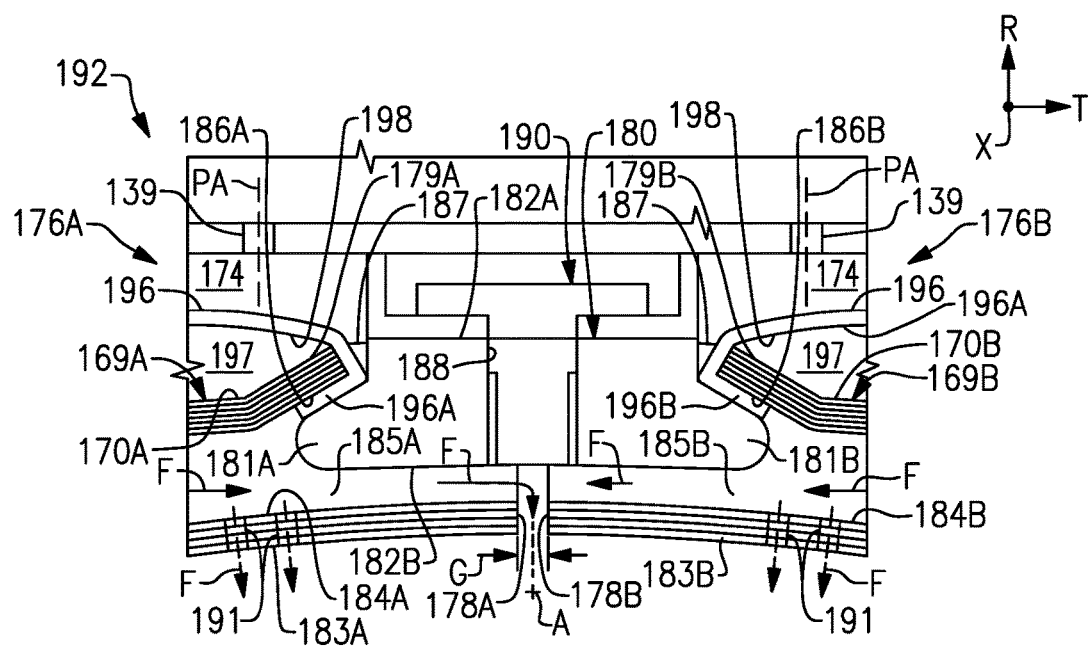
FIG. 8 illustrates a sectional view of the support of FIG. 7 between two adjacent seals and shields.

FIGS. 3-8 illustrate an exemplary outer air seal assembly 176 for sealing portions of the hot gaspath of the turbine engine. The outer air seal assembly 176 can be utilized for the seal assembly 76 of FIG. 2 or incorporated into a portion of the engine 20 of FIG. 1, for example. In the illustrated example of FIGS. 3-8, the seal 169 is a blade outer air seal (BOAS). FIG. 3 is an axial view of adjacent outer air seal assemblies 176 (indicated as 176A, 176B, 176C). FIG. 4 is a sectional view of the outer air seal assembly 176 in an installed position. FIGS. 5 and 6 illustrate perspective and plan views of the outer air seal 169. FIG. 7 illustrates a support or mounting block 180 of the seal assembly 176 inserted into the outer air seal 169. FIG. 8 illustrates a sectional view of the mounting block 180 between two adjacent outer air seals 169 (indicated as 169A, 169B). Although the components discussed herein primarily refer to a blade outer air seals (BOAS) in the turbine section 28, the teachings herein can also be utilized for other components of the engine 20, such as one of the airfoil platforms 62, 72, 73, an upstream stage of the compressor section 24, the mid-turbine frame 57, or combustor panels or liners defining portions of a combustion chamber located in the combustor section 26.

Referring to FIGS. 3 and 4, each seal assembly 176 includes an outer air seal 169 and at least one support or mounting block 180. Each outer air seal 169 is arranged in close proximity to a rotating blade airfoil tip 164 during operation of the engine. An array of the outer air seals 169 is circumferentially distributed about axis A and about an array of blades or airfoils 161 to bound a core flow path C (three seals 169A-169C shown in FIG. 3 for illustrative purposes).

Each outer air seal 169 includes an elongated main (or seal) body 170 that extends in a circumferential direction T between opposed (or first and second) mate faces 178. The mate faces 178 define the bounds of the intersegment gaps G (see FIG. 8) between adjacent outer air seals 169 and extends in an axial direction X between a leading edge portion 193 and a trailing edge portion 194. The main body 170 can have a generally elongated and arcuate profile, as illustrated by FIGS. 3 and 5. The outer air seal 169 includes an inner diameter (ID) sealing surface portion 177 that extends circumferentially between the outer air seal 169 mate faces 178. The ID sealing surface portion 177 includes a front side or seal face 183 that extends circumferentially between the mate faces 178. The seal face 183 faces toward and bounds a gas path, such as the core flow path C, when the seal 169 is located in an installed position. The sealing portion 177 includes a backside face 189 that is opposite to the seal face 183. In the illustrated example of FIGS. 3 and 4, the backside face 189 is radially outward of the seal face 183 relative to the engine axis A.

Each outer air seal 169 also includes engagement portion (s) 179 that extend between the opposed mate faces 178. Each engagement portion 179 can extend radially outward from the sealing portion 177 when in an installed position. The leading and trailing edge portions 193, 194 includes the radially extending walls of the main body 170 along the sealing portion 177 and/or the engagement portion 179 that span between the mate faces 178.

The outer air seal 169 includes an internal cavity 184 defined by the main body 170 that extends a distance circumferentially between the mate faces 178. The internal cavity 184 is defined between the sealing portion 177 and the engagement portion 179. The internal cavity 184 can extend inwardly from at least one or a pair of openings 185 along each of the respective mate faces 178 (shown in FIG. 5). In the illustrated example of FIGS. 3-8, the internal cavity 184 extends circumferentially from a first one of the openings 185 to a second one of the openings 185. The radially outboard backside face 189 extends circumferentially between the openings 185 to establish an external contour 171 of the main body 170.

The seal assembly 176 defines a cooling arrangement 192 to deliver cooling flow F to portions of the out air seal 169 and/or other portions of the seal assembly 176 or components of the engine. The engine case 137 or another portion of the engine static structure 136 defines at least one or a plurality of cooling passages 139. The cooling passages 139 are configured to communicate with and receive cooling flow from cooling source(s) 175. The cooling passages 139 communicate cooling flow F to one or more plenums 174 defined by the engine case 137.

The outer air seal 169 is exposed to temperature differentials between the gases in the core flow path C and the cooling flow F from the cooling source 175. Impingement cooling directly on the backside face 189 or other portions of the seal 169 can cause relatively sharp and/or large thermal gradients inducing high thermal strains during engine operation. Thermal gradients across the seal 169 in a radial direction R and/or circumferential direction T may cause thermal mechanical fatigue cracks to form in the outer air seal 169, for example.

Each seal assembly 176 includes an impingement shield 196 that is arranged to redirect or otherwise guide cooling flow F ejected by the cooling passages 139. The impingement shield 196 can be arranged to reduce thermal gradients in the outer air seal 169 that may otherwise be caused by direct impingement of cooling flow F on surfaces of the backside face 189. A plurality of circumferentially spaced apart shields 196 are distributed about the outer air seals 169 and about the engine axis A, as illustrated by FIGS. 3 and 7-8. The impingement shield 196 can be arranged to reduce communication of thermal radiation from the core flow path C to the plenum(s) 174, engine case 137 and/or cooling source(s) 175, which can improve the turbine component efficiency of the engine 20 due to the relatively lower cooling air flow level required to mitigate sharp and/or large thermal gradients as well as reducing absolute temperature levels of the out air seal 169.

The impingement shield 196 includes a shield body 196A that extends circumferentially between opposed end portions 196B. In the illustrated example of FIG. 3, the shield body 196A spans between the openings 185 such that the backside face 189 is situated between the internal cavity 184 and the shield body 196A. Said differently, the shield 196 substantially covers the backside face 189 relative to the adjacent cooling passages 139. The shield body 196A can be solid and substantially free of any apertures such that adjacent cooling flow F is guided over surfaces of the shield body 196A and towards other portions of the seal assembly 176.

Figure 3A:
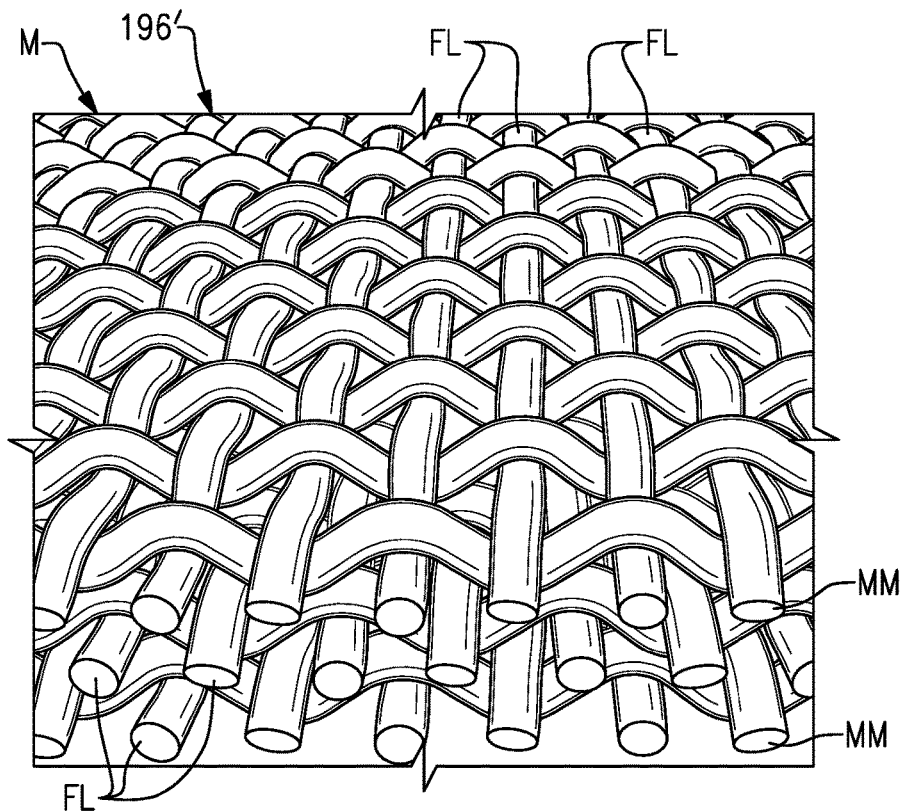
FIG. 3A is a zoom-in view of FIG. 3A illustrates selected portions of a shield according to an example.

In other examples, the shield body 196A includes one or more apertures 196D (shown in dashed lines in FIG. 4) to communicate cooling flow F from the plenum 174 in a direction towards the outer air seal 169. The apertures 196D can be arranged to direct the cooling flow F to more effectively pressurize and purge the exposed mate faces 178 at either end of the outer air seal 169 in order to prevent ingestion and/or entrainment of the hot gases in the core flow path C. In some instances the arrangement of cooling flow apertures 196D may be distributed to mitigate localized thermal hot spots and/or to reduce localized thermal temperature gradients along the surfaces of the backside face 189 that may result due to non-uniformities in of the gas temperatures in the core flow path C. In the illustrated example of FIG. 3A, impingement shield 196' is a mesh screen M that includes one or more layers MM (two shown for illustrative purposes) of interlaced filaments FL that define a porous construct. The porous construct can prevent or otherwise reduce direct impingement of the cooling flow F on the backside face 189 (FIG. 3).

The shield body 196A can have a generally arcuate profile, with a convex portion of the shield body 196A extending away and spaced apart from the backside face 189 to define the plenum 174 and at least one backside cooling cavity 197. In other examples, the shield body 196A has a generally planar geometry. In the illustrated example of FIGS. 3 and 4, the plenum 174 extends between the shield body 196A and surfaces of the engine case 137 that define the cooling passages 139. The backside cooling cavity 197 includes a pair of opposed openings 198 established between the shield body 196A and the backside face 189 of the main body 170 (see FIGS. 4 and 7). The openings 198 extend in at least the circumferential and axial directions T, X. The openings 198 can establish an inlet and outlet to circulate or otherwise communicate the cooling flow F from the plenum 174 into and out of the backside cooling cavity 197. A dimension of each opening 198 can be set to provide a desired amount of cooling flow F through the backside cooling cavity 197 and to improve the distribution of cooling flow F to mitigate local hot spots and sharp thermal gradients that may be present along portions of the outer air seal 169. The openings 198 can be continuous or non-continuous, and can be of a constant or varying height. The inlet and outlet defined by openings 198 communicate with the plenum 174 such that cooling flow F from the cooling passages 139 circulates across the backside face 189 to cool adjacent portions of the outer air seal 169.

The backside face 189 can be continuous and free of any cooling apertures such that the internal cavity 184 is fluidly isolated from each backside cooling cavity 197. In some examples, the main body 170 defines one or more cooling apertures 199 (shown in dashed lines in FIG. 4). The cooling apertures 199 can communicate cooling flow F between the backside cooling cavity 197 (or plenum 174) and the internal cavity 184. The cooling apertures 199 can communicate the cooling flow F into the internal cavity 184 to pressurize and purge the exposed mate faces 178 at either end of the outer air seal 169 to prevent or otherwise reduce ingestion and/or entrainment of the hot gases in the core flow path C. Keeping the coolant flow F active and pressurized within internal cavity 184 can also prevent or otherwise reduce contaminants and other environmental particulate from being deposited in an otherwise stagnate cavity which may adversely impact the thermal mechanical characteristics of the material properties of the outer air seal 169. The cooling apertures 199 can be distributed and dimensioned to provide additional mitigation of local hot spots and sharp thermal gradients induced by variations in both local circumferential and axial heat flux and temperature distributions along the ID sealing surface portion 177. Cooling of the backside face 189 can cause portions of air in the internal cavity 184 to be cooled by conductive heat transfer through the wall of the shield body 196A to provide cooling to portions of the seal 169 adjacent to the internal cavity 184.

Figure 9:
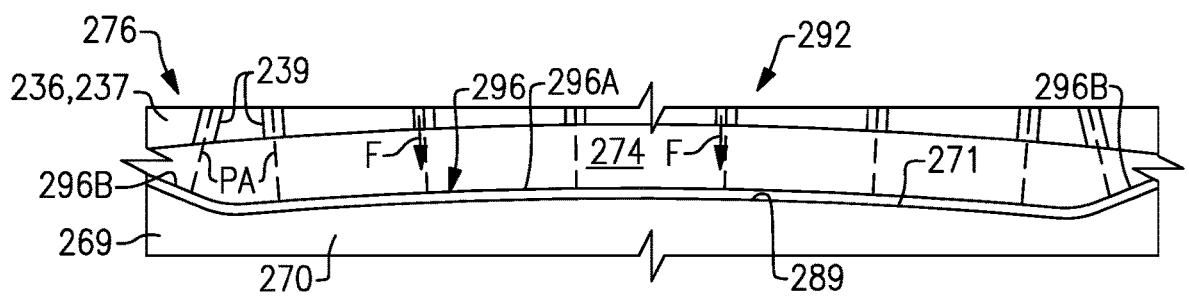
FIG. 9 illustrates a seal assembly according to another example.

In other examples, shield body 296A is dimensioned to substantially follow an external contour 271 of backside face 289, as illustrated by the outer air seal assembly 276 of FIG. 9. The shield body 296A can directly contact surfaces of the backside face 289 such that cooling arrangement 292 is free of any backside cooling cavity. For the purposes of this disclosure, the term "substantially follow" means that some spacing between the shield body 296A and backside face 289 can occur due to manufacturing tolerances or imperfections, for example.

As previously discussed, referring back to FIG. 4, the impingement shield 196 can be arranged to reduce thermal gradients in the outer air seal 169. Each of the cooling passages 139 defines a respective passage axis PA. The cooling passages 139 eject cooling flow F into the plenum(s) 174 and toward the shield body 196A of the shield 196 in a direction along the passage axis PA. The passage axis PA of at least some, or each of, the cooling passages 139 can be oriented such that a projection of the passage axis PA intersects the shield body 196A of the outer air seal 169 to provide localized impingement cooling to portions of the shield body 196A adjacent to the backside face 189. The projection of the passage axis PA can intersect the backside face 189, but the shield body 196A is situated between the corresponding cooling passage 139 and the backside face 189 to redirect the cooling flow F away from the backside face 189. In some examples, some impingement cooling on the backside face 189 may occur without departing from the teachings disclosed herein. The shield 196 isolates, at least portions of the backside face 189 from direct impingement of the cooling flow F, but allows the backside face 189 to receive the cooling flow F indirectly by circulating through the backside cooling cavity 197.

Each passage axis PA can be perpendicular or transverse to the shield body 196A at the point of intersection (see, e.g., passages 139A and 139B of FIG. 4, respectively). The points of intersection can be spaced apart a distance from the openings 198 along sidewalls of the shield body 196A to cause the cooling flow F to follow along surfaces of the shield body 196A prior to entry into the openings 198 to cool portions of the outer air seal 169 along and adjacent to the backside face 189.

Various materials can be utilized to manufacture the seal 169, mounting block 180 and impingement shield 196. In some examples, the seal 169 is made of a first material, and the mounting block 180 and/or impingement shield 196 is made of a second, different material. For example, the first material can include a ceramic or ceramic matrix composite (CMC) material. For the purposes of this disclosure, ceramic material means a ceramic or ceramic matrix composite (CMC) material. The outer air seal 169 can be formed from a monolithic ceramic, or the seal 169 can be formed from one or more layers L of a CMC layup (FIG. 4), for example. The outer air seal 169 can be made of another material, such as a high temperature metal, alloy, or composite material. The outer air seal 169 can be formed to have a unitary construction. In alternative examples, the sealing portion 177 and each engagement portion 179 of the seal 169 are separate and distinct components that are mechanically attached to one another with one or more fasteners.

The mounting block 180 and/or impingement shield 196 can be made of a second material such as a high temperature composite, metal, or alloy, such as a nickel-based superalloy, for example. The first and second materials can differ. In other examples, the out air seal 169 is made of a first material, and the mounting block 180 and/or impingement shield 196 is made of a second material that is the same as the first material, including any of the materials disclosed herein. In some examples, the impingement shield 196 is fabricated from sheet metal and is formed to the desired geometry and/or may be directly fabricated using advanced metal powder bed laser fusion additive manufacturing methods.

Referring to FIGS. 7 and 8, with continued reference to FIGS. 3-6, the mounting block 180 can be arranged to secure one or more of the seals 169 to a housing such as engine case 137, or to another portion of the engine static structure 136. An adjacent pair of the shields 196 are shown in phantom in FIG. 7. An adjacent pair of outer air seals 169 are indicated as seals 169A, 169B in FIG. 8. The end portions 196B of the shield 196 are mechanically attached to an engagement portion 179 of the main body 170 adjacent to respective ones of the mate faces 178.

Each mounting block 180 secures the engagement portions 179A, 179B and the end portions 196B of the shields 196 to the engine case 137 when in the installed position. The mounting block 180 includes at least one interface portion 181 extending outwardly from a main body or mounting portion 182. The mounting block 180 includes a pair of opposed interface portions 181 (indicated as 181A, 181B in FIGS. 7 and 8) that extend outwardly from the mounting portion 182. Each mounting block 180 can be arranged along a respective one of the intersegment gaps G and engages an end portion 196B each of the respective shield bodies 196A of the adjacent shields 196 to trap the shield bodies 196A between the mounting block 180 and the engagement portions 179 of the seals 169. The mounting block 180 can be arranged between the engagement portions 179A, 179B to circumferentially space apart the outer air seals 169A, 169B.

A cross-section of the mounting block 180 can have a generally trapezoidal geometry, as illustrated by FIGS. 7 and 8. Surfaces of each interface portion 181 slope outwardly between a top 182A and bottom 182B of the mounting portion 182. The interface portions 181 can have a dovetail geometry. Each interface portion 181 of the mounting block 180 can be inserted into, received in, or otherwise extend through a respective opening 185 to secure the adjacent outer air seals 169A, 169B to the engine static structure 136. The end portions 196B of the shield 196 can be dimensioned to mate with ramped surfaces 186 (indicated as 186A, 186B in FIG. 8) of the internal cavity 184.

The interface portion 181 of the mounting block 180 can be dimensioned to abut an end portion 196B of the shield body 196A to trap or sandwich the end portion 196B of the shield body 196A between the interface portion 181 and the ramped surfaces 186 of the internal cavity 184 to support the adjacent seals 169A, 169B relative to the engine case 137 and to limit relative movement of the adjacent seals 169A, 169B and impingement shields 196 in the radial and/or circumferential directions R, T relative to the engine axis A, for example. The dovetail geometry circumferentially overlaps with walls of the engagement portions 179A, 179B and the end portions 196B of the shields 196 when in the installed position to secure adjacent pairs of the seals 169A, 169B and shields 196 to the engine case 137.

The dovetail geometry of the interface portion 181 can extend through the opening 185 during assembly to mate with the end portion 196B of the shield body 196A and bound movement of the out air seal 169 and shield 196 relative to the mounting block 180. Ends of the interface portions 181 can be contoured to guide the interface portions 181 through one of the openings 185 and into the respective internal cavity 184 during installation. The dovetail geometry and contouring can reduce mechanical stress on the outer air seal 169, including seals made of a composite material which can be strong, but relatively brittle. The material of the shield 196 can be selected to have a relatively lesser stiffness than the material of the mounting block 180 such that the end portions 196B of the shield 196 can absorb forces exerted by the mounting block 180 to reduce stress on the engagement portion 179 of the outer air seal 169 during engine operation.

Each interface portion 181 can include an outwardly extending retention feature 187. The retention feature 187 is dimensioned to abut or seat against surfaces of the end portion 196B of the shield 196 and/or the engagement portion 179 to seat or otherwise secure the outer air seal 169 and shield 196 during assembly and limit circumferential and/or radial movement.

The mounting block 180 can be secured to the engine case 137 using one or more fasteners 190 (one shown in FIG. 8 for illustrative purposes). Each mounting portion 182 defines an aperture 188 that receives a respective fastener 190 to mechanically attach the mounting portion 182 to the engine case 137 and limit relative movement of one or more outer air seals 169 and shields 196. In the illustrated example of FIG. 8, the fastener 190 is a bolt, and the aperture 188 threadably receives a length of the bolt. In alternative examples, the fastener 190 is a clip or another structure to secure the outer air seal 169 and shield 196 to the engine static structure 136.

In the illustrated example of FIG. 8, the adjacent seals 169A, 169B are arranged in close proximity such that the respective mate faces 178A, 178B define an intersegment gap G that can extend a distance in the circumferential direction T. The mounting block 180 is situated between the mate faces 178A, 178B such that the mounting block 180 spans across the intersegment gap G. A portion of the fastener 190 can be circumferentially aligned with one or more of the adjacent mate faces 178A, 178B and/or the intersegment gap G. In alternative examples, the mounting block 180 is positioned at another location than along the intersegment gap G to secure the outer air seal 169 and the shield 196 to the engine case 137, such as a midspan of the seal 169.

A method of sealing is as follows. With reference to FIG. 8, the shield 196 is secured to the engine static structure 136, which can include inserting end portions 196B of each of the shields 196 into a respective one of the openings 185A, 185B (see also FIG. 5) and bringing the end portions 196B of the shields 196 into abutment with the ramped surfaces 186A, 186B of the respective internal cavity 184A, 184B. The shield 196 can be clipped on or otherwise attached to the seal 169 by bending around the end portions 196B and into the internal cavity 184, 184B, for example.

A mounting block 180 is positioned between mate faces 178A, 178B of each adjacent pair of seals 169A, 169B. Each of the interface portions 181A, 181B is inserted or otherwise moved in a circumferential direction T through either one of the respective openings 185A, 185B and into abutment with the end portions 196B of the impingement shield 196 to bound movement of the seals 169A, 169B and shields 196. Thereafter, the fastener 190 is mechanically attached or otherwise secured to the mounting block 180.

Referring to FIGS. 3-4, with continued reference to FIG. 8, during operation of the engine, pressurized cooling flow F is communicated from the cooling source 175 to the cooling passages 139. The cooling passages 139 eject the cooling flow F into the plenum 174 and in a direction toward the shield body 196A of the impingement shield 196 and the backside face 189 of the seal 169. The cooling flow F can be discharged from the cooling passages 139 at a predetermined pressure and velocity such that the cooling flow F impinges on localized surfaces of the impingement shield 196. The cooling flow F circulates from the plenum 174 and into the opening(s) 198. The cooling flow F circulates from the opening(s) 198 and disperses into the backside cooling cavity 197 to cool adjacent portions of the out air seal 169 that bound the cavity 197.

As illustrated by FIG. 8, the mounting block 180 can be dimensioned relative to surfaces of the internal cavity 184 such that cooling flow F in the internal cavity 184 can exit the openings 185 along the mate faces 178 and into the intersegment gaps G. Communication of the cooling flow F can cool portions of the mate faces 178, thereby improving durability of the outer air seals 169. Communicating the cooling flow F into each intersegment gap G can also create a fluidic sealing boundary and/or cooling purge relationship to be formed, which reduces the likelihood of ingestion of hot combustion gases from the core flow path C and into the intersegment gap G. In examples, the ID sealing portion surface 177 (FIGS. 3 and 4) of the outer air seal 169 may include film cooling hole(s) 191 (shown in dashed lines in FIG. 8) to eject cooling flow F from the internal cavity 184 onto the ID seal face 183 of the outer air seal 169 in order to reduce the detrimental locally hot external gas temperatures and external heat flux conditions that can exist within the core flow path C.

Figure 10:
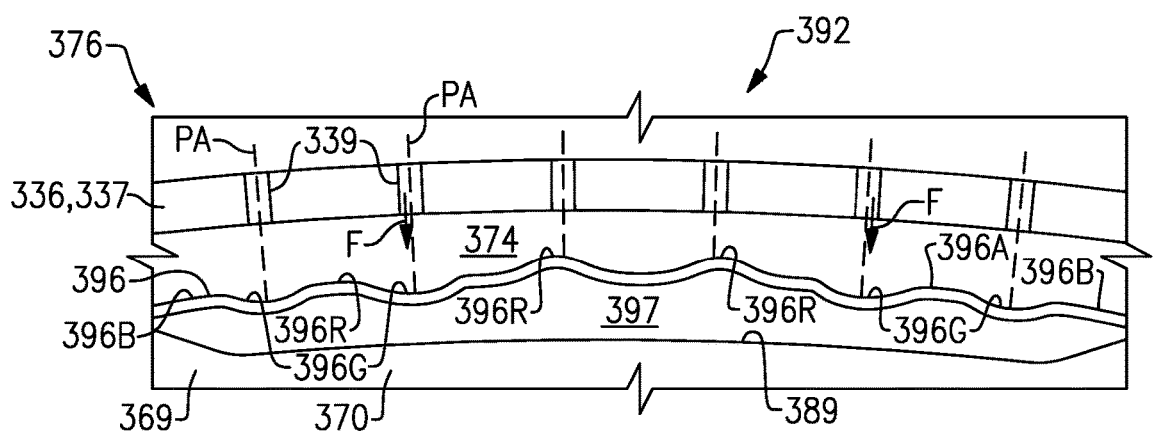
FIG. 10 illustrates an exemplary seal assembly.

FIG. 10 illustrates an outer air seal assembly 376 according to another example. An impingement shield 396 can be contoured to comprise of various sized concave and convex surfaces forming both uniform and non-uniform "crenulated like" surfaces to optimize the local impingement and/or convective heat transfer. In addition, such impingement shield geometry shaping can improve control in the amount of cooling air flow that may be required to achieve the desired local thermal cooling effectiveness to mitigate local hot spots and sharp thermal in-plane and thru wall gradients present in portions of the outer air seal 369, which can improve component capability and durability life. Furthermore, the shield body 396A includes a plurality of undulations that vary the distance between surfaces of the shield body 396A and backside face 389 of the seal 369. In the illustrated example of FIG. 10, the shield body 396A defines a plurality of troughs or grooves 396G and a plurality of ridges 396R that establish the undulations. The grooves 396G are depressions in the shield body 396A and do not extend entirely through a thickness of the shield body. The ridges 396R are elevated relative to surrounding portions of the shield body 396A. The grooves 396G can have a concave geometry, and the ridges 396R can have a convex geometry, for example. The grooves 396G and ridges 396R are distributed between opposed end portions 396B of the shield 396. At least some, or each, of the grooves 396G and/or ridges 396R can be aligned with a projection of a passage axis PA of a respective one of the cooling passages 339. The grooves 396G can redistribute or guide portions of the cooling flow F across the shield 396 in either or both the axial and/or circumferential directions, for example, to provide localized cooling augmentation to portions of the outer air seal 369. The dimensions of the grooves 396G and ridges 396R including the width and depth can be set to provide a desired amount of localized cooling augmentation.

Figure 11:
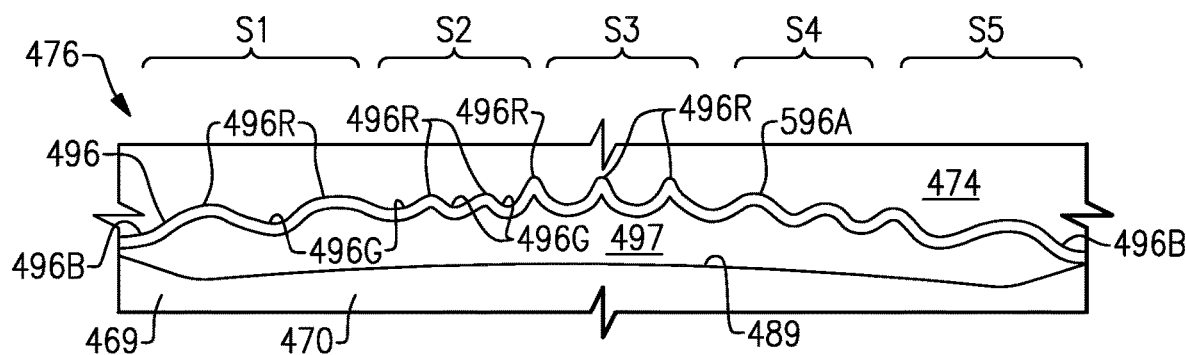
FIG. 11 illustrates another example seal assembly.

The frequency, periodicity, and/or amplitude of the grooves and ridges can be varied to adjust the amount of cooling provided to localized portions of seal and reduce thermal strains, as illustrated by the seal assembly 476 of FIG. 11. Grooves 496G and ridges 496R can be arranged in sets S1-S5 having different frequencies and amplitudes. Shield 496 can be symmetrical such that sets S1, S5 and/or sets S2, S4 have the same frequencies and amplitudes, or the sets can differ. The undulations defined by the grooves 496G and ridges 496R can be periodic or non-periodic. The frequencies and amplitudes of the grooves 496G and ridges 496R can be set to provide different levels of cooling augmentation to portions of the outer air seal 469.

Figure 12:
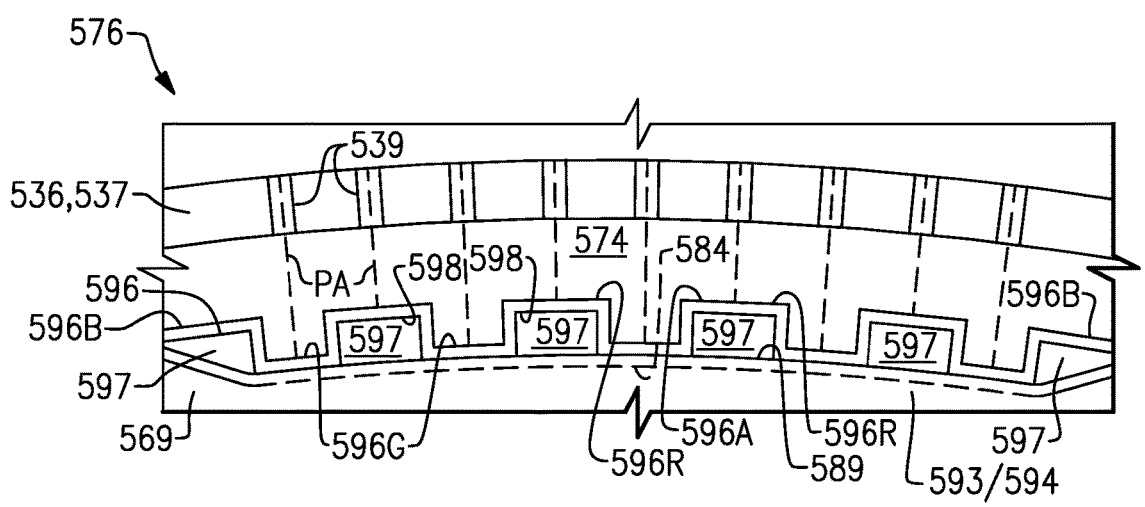
FIG. 12 illustrates a seal assembly according to another example.
Figure 13:
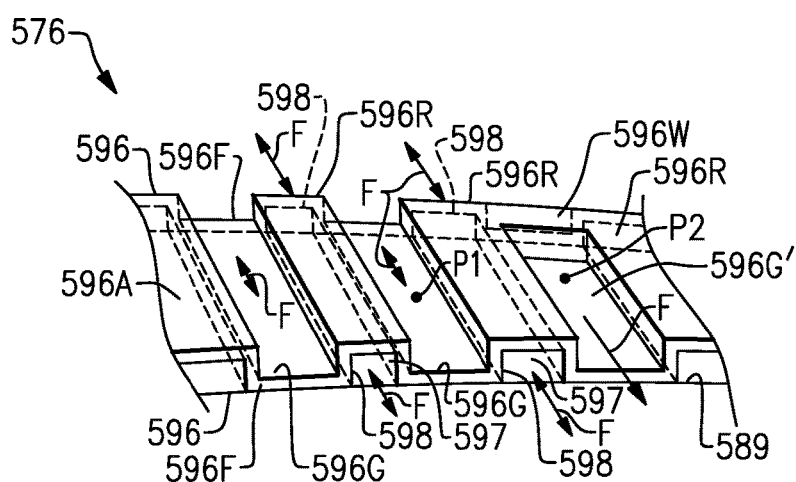
FIG. 13 illustrates a perspective view of selected portions of the seal assembly of FIG. 12.

FIGS. 12 and 13 illustrate a seal assembly 576 according to yet another example. Impingement shield 596 includes a plurality of ridges 596R that are spaced apart from backside face 589, and walls of the impingement shield 596 that define a plurality of grooves 596G that contact surfaces of backside face 589 to define a plurality of separate and distinct backside cooling cavities 597. The backside cooling cavities 597 are established between walls of the ridges 596R and the backside face 589. Each of the backside cooling cavities 597 can extend between opposed edge faces 596F of shield body 596A. Each of the cavities 597 includes opposed openings 598 along the edge faces 596F that define a respective inlet and outlet to communicate cooling flow F across the backside face 589. The cooling flow F can be communicated through the backside cooling cavities 597 such that each of the cavities 597 communicates portions of the cooling flow F across a respective localized surface of the backside face 589. Internal cavity 584 (shown in dashed lines in FIG. 12) can be fluidly isolated from the backside cooling cavities 597.

Although shown as sharped edge constant area channels for illustrative purposes, the backside cooling cavities 597 may vary in cross sectional area in either the axial and/or circumferential streamwise directions in order to optimize the cooling flow F cavity Mach Number, Reynolds Number, and convective heat transfer in order to tailor heat pickup and thermal cooling effectiveness requirements. Additionally, the shape of the cooling cavities 597 may also comprise non-orthogonal and non-planar surfaces. In such instances the cooling cavities 597 may take the form of alternative geometries that may improve both thermal cooling and structural characteristics of the shield 596. Such geometric cavity shapes may consist of, but are not limited to, conical, elliptical, and/or trapezoidal shapes of varying aspect ratios.

The shield 596 can be oriented such that a length of the grooves 596G can extend in an axial direction relative to the engine axis A to redirect flow between leading and trailing portions (see, e.g., portions 193, 194 of FIG. 4). In other examples, shield 596 can be oriented such that a length of the grooves 596G can extend in a circumferential direction relative to the engine axis A to redirect flow towards the mate faces (see, e.g., mate faces 178 of FIG. 3). Redirecting flow to towards the mate faces can assist in controlling the cooling augmentation in outer air seal arrangements having a limited number of cooling passages oriented towards the seal, for example.

A projection of passage axis PA of at least some of the cooling passages 539 can be aligned with a respective one of the grooves 596G. The grooves 596G increase an impingement distance between an outlet of the cooling passage 539 and the shield body 596A and decrease a distance between the shield body 596A and the backside face 589. The decreased distance can provide increased cooling augmentation to adjacent portions of the backside face 589. A projection of passage axis PA of at least some of the cooling passages 539 can be aligned with a respective one of the ridges 596R. The ridges 596R decrease an impingement distance between an outlet of the cooling passage 539 and the shield body 596A and increase a distance between the shield body 596A and the backside face 589. Varying the distances can increase or decrease the amount of localized convective heat transfer augmentation in order to more closely match and minimize local temperature hotspots and thermal temperature gradients of adjacent portions of the outer air seal 569.

Figure 14:
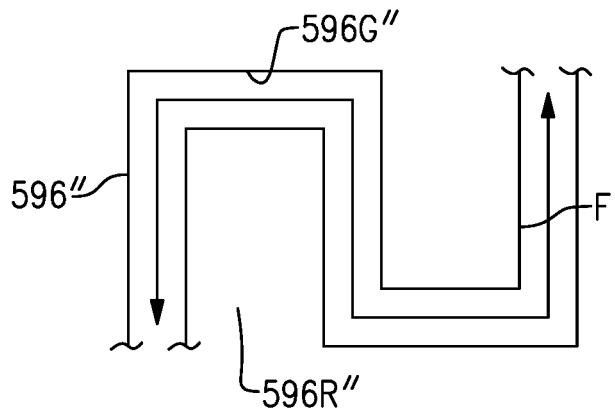
FIG. 14 illustrates a seal assembly according to yet another example.

An end of one or more of the grooves 596G' (one shown for illustrative purposes) can be bounded by a wall portion 596W that spans between adjacent ridges 596R. The wall portion 596W restricts or impedes a direction of flow of cooling flow F along the respective groove 596G'. For example, the wall portion 596W can restrict flow of cooling flow F in an axial direction relative to the engine axis A such that cooling flow is directed in an axially forward direction to cool relatively hotter portions of the seal 569. In the illustrated example of FIG. 14, one or more grooves 596" can establish a tortuous path for the cooling flow F to follow (one groove 596G" shown for illustrative purposes). The tortuous path can guide the cooling flow F to one or more hot spots that may be observed for seal 569".

The projection of the passage axis PA can be oriented to intersect an end of a respective one of the grooves 596 to cause cooling flow F to be guided from the end of the groove 596G toward another end of the groove 596G, as illustrated by point P1 relative to groove 596G' (FIG. 13). The projection of the passage axis PA can be oriented to intersect an intermediate location of the groove 596G to cause cooling flow F to disperse or spread the cooling flow F in different directions.

Figure 15:
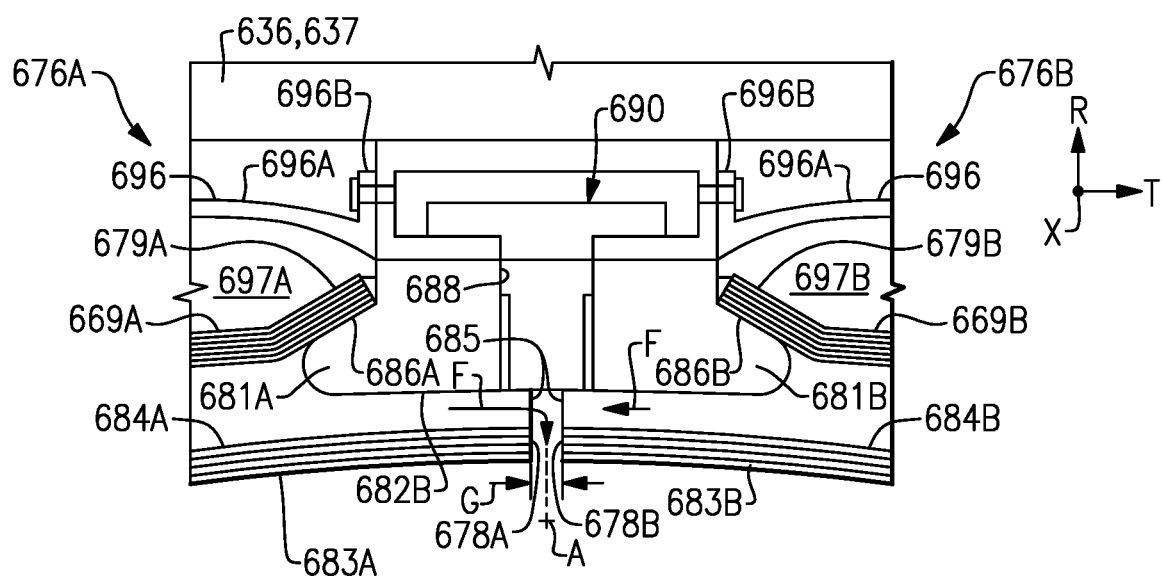
FIG. 15 illustrates a sectional view of a support between two adjacent seals and shields according to another example.

Other techniques can be utilized to secure the shield to the engine static structure. In the illustrated example of FIG. 15, the shield 696 can be mechanically attached to engine case 637 or another portion of the engine static structure 636. For example, end portions 696B can define flanges that extend outwardly from shield body 696A. The end portions 696B can abut against the engine case 637 and can be secured using one or more fasteners, for example.

Interface portions 681A, 681B of the mounting block 680 can be dimensioned to abut ramped surfaces 686A, 686B of internal cavities 684A, 686B to limit relative movement and to secure adjacent pairs of the seals 669A, 669B to engine case 637.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine comprising:
   a seal including an elongated seal body extending between a seal face that faces toward a gas path and a backside face opposite the seal face, and the seal face extending circumferentially between first and second mate faces;
   wherein the seal body defines an internal cavity that extends circumferentially from a first opening along the first mate face to a second opening along the second mate face, and the backside face extends between the first and second openings; and
   a shield including a shield body that spans between the first and second openings such that the backside face is situated between the internal cavity and the shield body.

2. The seal assembly as recited in claim 1, wherein the seal is made of a first material including a ceramic material, and the seal has a unitary construction.

3. The seal assembly as recited in claim 1, wherein the shield body is dimensioned to substantially follow a contour of the backside face.

4. The seal assembly as recited in claim 1, wherein the shield body is spaced apart from the backside face to define at least one backside cooling cavity that includes a pair of opposed openings established between the shield body and the seal body.

5. The seal assembly as recited in claim 1, wherein the shield body defines a plurality of grooves and a plurality of ridges that are distributed between opposed end portions of the shield.

6. The seal assembly as recited in claim 5, wherein the plurality of ridges are spaced apart from the backside face and the plurality of grooves contact surfaces of the backside face to define a plurality of backside cooling cavities each with a respective inlet and outlet.

7. The seal assembly as recited in claim 1, wherein the shield body extends circumferentially between opposed end portions, and each of the opposed end portions is mechanical attached to an engagement portion of the seal body adjacent to respective ones of the first and second mate faces.

8. The seal assembly as recited in claim 1, further comprising a mounting block including an interface portion extending from a mounting portion, the interface portion abutting an end portion of the shield body to trap the shield body between an engagement portion of the seal body and the interface portion to limit relative movement, and the mounting portion defining an aperture that receives a fastener to mechanically attach the mounting portion to an engine static structure.

9. The seal assembly as recited in claim 8, wherein the interface portion has a dovetail geometry that extends through the first opening to mate with the end portion of the shield body and bound movement of the seal relative to the mounting block.

10. The seal assembly as recited in claim 9, wherein the mounting block is a first mounting block and a second mounting block, and the interface portion of the first mounting block is received in the first opening and the interface portion of the second mounting block is received in the second opening to secure the seal to the engine static structure.

11. The seal assembly as recited in claim 8, wherein the seal is made of a first material, and the mounting block is made of a second material that is the same as the first material.

12. The seal assembly as recited in claim 8, wherein the seal is made of a first material, and the mounting block is made of a second, different material.

13. The seal assembly as recited in claim 12, wherein the first material includes a ceramic material, and the seal has a unitary construction.

14. The seal assembly as recited in claim 1, wherein the seal is made of a first material, and the shield is made of a second, different material.

15. The seal assembly as recited in claim 1, wherein the seal is a blade outer air seal (BOAS).

16. A gas turbine engine comprising:
    an engine case extending along an engine axis;
    an array of blades rotatable about the engine axis; and
    an array of blade outer air seals distributed about the array of blades to bound a core flow path, wherein each of the seals comprises:
        an elongated seal body including a seal face that faces toward the core flow path and a backside face opposite the seal face; and
        wherein the seal body defines an internal cavity that extends circumferentially between opposed mate faces;
    an array of shields distributed about the array of seals, each of the shields including a shield body that spans between the mate faces of a respective one of the seals such that the backside face is situated between the shield body and the respective internal cavity; and
    wherein the engine case defines a plurality of cooling passages that communicate with a cooling source, and each of the plurality of cooling passages defines a passage axis that is oriented such that a projection of the passage axis intersects the shield body of a respective one of the seals.

17. The gas turbine engine as recited in claim 16, wherein the seal is made of a first material including a ceramic material, and the seal has a unitary construction.

18. The gas turbine engine as recited in claim 16, wherein the shield body is spaced apart from the backside face of the respective one of the seal bodies to define a plenum and at least one backside cooling cavity, the plenum extends between the shield body and surfaces of the engine case that define the plurality of cooling passages, and the at least one backside cooling cavity includes an inlet and outlet established between the shield body and the respective seal body that communicates with the plenum such that cooling flow from the plurality of cooling passages circulates across the backside face.

19. The gas turbine engine as recited in claim 16, further comprising an array of circumferentially spaced apart mounting blocks, wherein the mate faces of adjacent seals of the array of seals are arranged to define a plurality of intersegment gaps, each of the mounting blocks is arranged along a respective one of the plurality of intersegment gaps and engages an end portion of a respective shield body to trap the shield body between the respective one of the mounting blocks and the respective one of the adjacent seals, and each of the mounting blocks is mechanically attached to the engine case to limit movement of the adjacent seals relative to the engine case.

20. A method of sealing of a gas turbine engine, comprising:
   securing a mounting block to an engine static structure such that the mounting block is positioned between mate faces of adjacent blade outer air seals;
   wherein each of the adjacent seals comprises:
       an elongated seal body including a seal face that bounds a gas path and a backside face opposite the seal face; and
       wherein the seal body defines an internal cavity that extends circumferentially between opposed mate faces; and
   securing a shield to the engine static structure, the shield including a shield body that spans between the mate faces such that the backside face is situated between the internal cavity and the shield body; and
   ejecting cooling flow from a plurality of cooling passages towards the shield body.

21. The method as recited in claim 20, wherein the engine static structure is an engine case that defines the plurality of cooling passages, and each of the plurality of cooling passages defines a passage axis that is oriented such that a projection of the passage axis intersects the shield body.

22. The method as recited in claim 20, further comprising communicating the cooling flow through a plurality of backside cooling cavities established between the backside face and the shield body such that each of the plurality of backside cooling cavities communicates the cooling flow across a respective localized surface of the backside face.

23. The method as recited in claim 22, wherein the internal cavity is fluidly isolated from the plurality of backside cooling cavities.

* * * * *